(12) United States Patent
Hermoni et al.

(10) Patent No.: US 11,403,544 B1
(45) Date of Patent: Aug. 2, 2022

(54) SYSTEM, METHOD, AND COMPUTER PROGRAM FOR VALIDATING ARTIFICIAL INTELLIGENCE MODELS

(71) Applicant: Amdocs Development Limited, Limassol (CY)

(72) Inventors: Ofer Hermoni, Tenafly, NJ (US); Eyal Felstaine, Herzliya (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 290 days.

(21) Appl. No.: 16/453,584

(22) Filed: Jun. 26, 2019

Related U.S. Application Data

(60) Provisional application No. 62/690,290, filed on Jun. 26, 2018.

(51) Int. Cl.
 *G06N 20/00* (2019.01)
 *G06N 7/00* (2006.01)

(52) U.S. Cl.
 CPC .............. *G06N 7/005* (2013.01); *G06N 20/00* (2019.01)

(58) Field of Classification Search
 CPC .......... G06N 7/005; G06N 7/00; G06N 20/00; G06N 20/10; G06N 20/20
 See application file for complete search history.

(56) References Cited

U.S. PATENT DOCUMENTS

| | | | | |
|---|---|---|---|---|
| 9,542,646 | B1* | 1/2017 | Baughman | G06N 3/126 |
| 2004/0181370 | A1* | 9/2004 | Froehlich | G06F 9/5083 |
| | | | | 702/187 |
| 2018/0150764 | A1* | 5/2018 | Stenneth | G06Q 50/30 |
| 2018/0218283 | A1* | 8/2018 | Jenson | G06Q 50/01 |
| 2018/0330083 | A1* | 11/2018 | Abbaszadeh | G06N 20/00 |
| 2019/0026634 | A1* | 1/2019 | Homeyer | G06Q 10/103 |

OTHER PUBLICATIONS

Lassettre et al., "Dynamic Surge Protection: An Approach to Handling Unexpected Workload Surges with Resource Actions that Have Lead Times", 2003 https://link.springer.com/chapter/10.1007/978-3-540-39671-0_8 (Year: 2003).*

(Continued)

*Primary Examiner* — Brian M Smith
*Assistant Examiner* — Shoun J Abraham
(74) *Attorney, Agent, or Firm* — Zilka-Kotab, P.C.

(57) ABSTRACT

A system, method, and computer program product are provided for validating artificial intelligence models. In operation, a data set is obtained. At least one first artificial intelligence (AI) model on the data set is run, for a first time period, to output first predictions. Additionally, at least one second AI model on the data set is run, for a second time period that is less than the first time period, to output second predictions. A first probability of the first predictions and an error of the second predictions are calculated. Further, a second probability of the first predictions is calculated based on the first probability and the error. A representative AI model of the at least one first AI model is selected based on the second probability.

6 Claims, 7 Drawing Sheets

(56) References Cited

OTHER PUBLICATIONS

Nguyen et al. "Multiple neural networks for a long term time series forecast", Dec. 2003 https://link.springer.eom/article/10.1007/s00521-003-0390-z#Sec3 (Year: 2003).*

Kasemset et al. "Multiple Regression Model for Forecasting Quantity of Supply of Off-season Longan", Dec. 2014 https://www.researchgate.net/publication/276417263_Multiple_Regression_Model_for_Forecasting_Quantity_of_Supply_of_Off-season_Longan (Year: 2014).*

Sorjamaa et al. "Methodology for long-term prediction of time series", Oct. 2007 https://www.sciencedirect.com/science/article/pii/S0925231207001610 (Year: 2007).*

Xu et al. "Concept drift learning with alternating learners", May 2017 https://ieeexplore.ieee.org/abstract/document/7966109 (Year: 2017).*

* cited by examiner

SYSTEM, METHOD, AND COMPUTER PROGRAM FOR VALIDATING ARTIFICIAL INTELLIGENCE MODELS

RELATED APPLICATIONS

The present application claims priority to U.S. Provisional Application No. 62/690,290, entitled "SYSTEM, METHOD, AND COMPUTER PROGRAM FOR VALIDATING ARTIFICIAL INTELLIGENCE MODELS," filed on Jun. 26, 2018, the entire contents of which is incorporated herein by reference.

FIELD OF THE INVENTION

The present invention relates to a system for validating artificial intelligence models.

BACKGROUND

Artificial intelligence systems may be used to generally respond to an input to take action. For example, an artificial intelligence model may be used to determine whether an intervention is necessary. If network traffic is predicted to pass a threshold in two hours, a server may need to be added. As such, when the model makes the prediction, a server may be added. Another example may include a storm warning, where, when the model makes a prediction of a storm, a port may be closed.

Generally, one problem that may arise is that the current data that is being used for prediction may be different than the data that was used for learning, which may lead to mistakes. For example, if data relating to an amount of traffic in a weekend was used to predict holiday traffic, the resulting prediction would be inaccurate (as normal weekend traffic may fluctuate on a holiday weekend), etc.

There is thus a need for addressing these and/or other issues associated with the prior art.

SUMMARY

A system, method, and computer program product are provided for validating artificial intelligence models. In operation, a data set is obtained. At least one first artificial intelligence (AI) model on the data set is run, for a first time period, to output first predictions. Additionally, at least one second AI model on the data set is run, for a second time period that is less than the first time period, to output second predictions. A first probability of the first predictions and an error of the second predictions are calculated. Further, a second probability of the first predictions is calculated based on the first probability and the error. A representative AI model of the at least one first AI model is selected based on the second probability.

DETAILED DESCRIPTION

Figure 1:
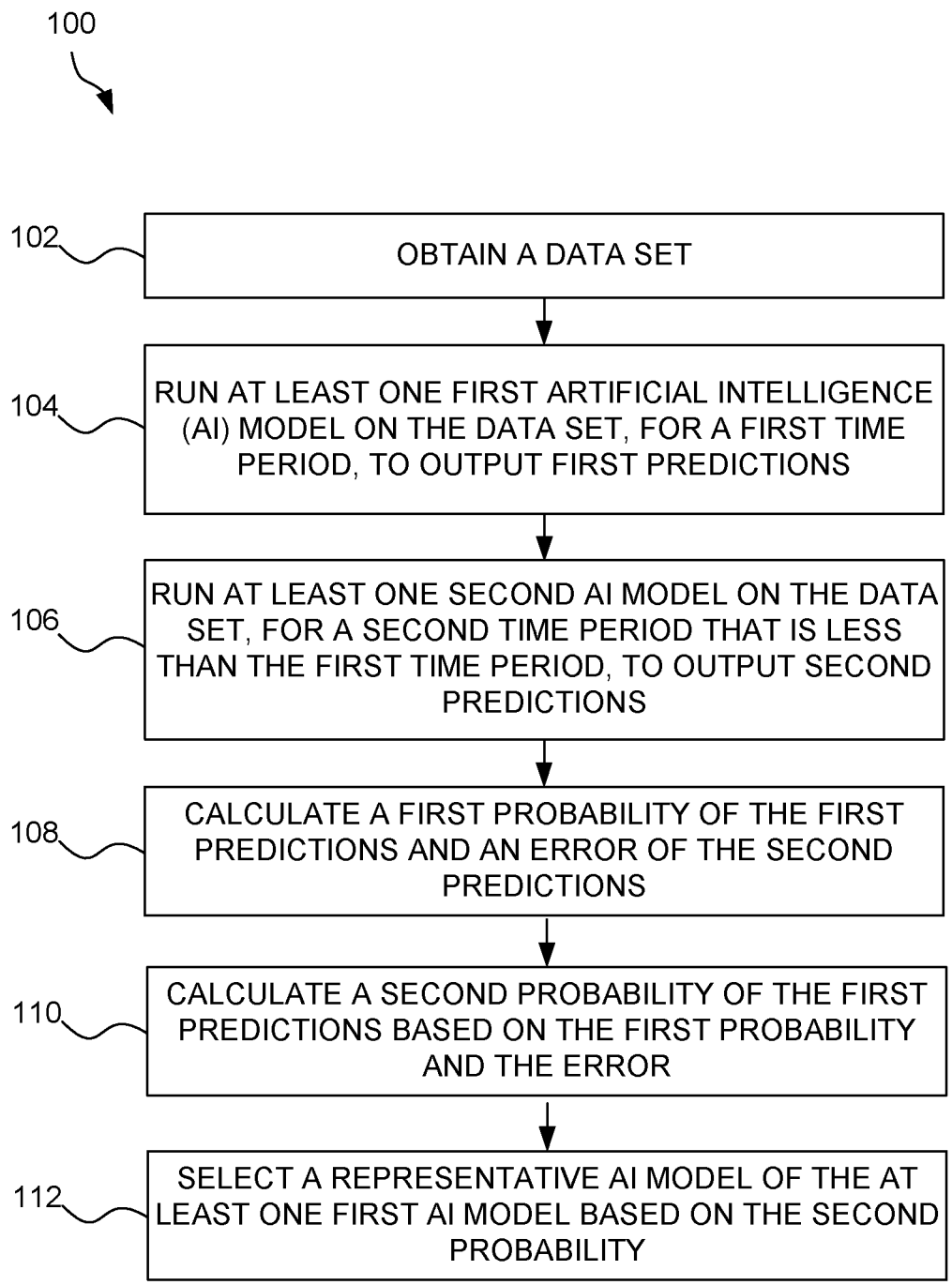
FIG. 1 illustrates a method for validating artificial intelligence models, in accordance with one embodiment.

FIG. 1 illustrates a method 100 for validating artificial intelligence models, in accordance with one embodiment.

In operation, a system obtains a data set. See operation 102. The system runs at least one first artificial intelligence (AI) model on the data set, for a first time period, to output first predictions. See operation 104. The system runs at least one second AI model on the data set, for a second time period that is less than the first time period, to output second predictions. See operation 106.

The system calculates a first probability $P_1$ of the first predictions and an error of the second predictions. See operation 108. Additionally, the system calculates a second probability $P_2$ of the first predictions based on the first probability $P_1$ and the error. See operation 110. Further, a representative AI model of the at least one first AI model is selected based on the second probability $P_2$. See operation 112.

In various embodiments, the error may be calculated based on a deviation between the second predictions and a result of the data set evaluated at the conclusion of the second time period. Additionally, the at least one first AI model may include a long term model, the at least one second AI model may include a short term model, and a combination of the long term model and the short term model may form a model pair.

In another embodiment, the at least one first AI model may be correlated with the at least one second AI model based on at least one a historical correlation, a mathematical/statistical model, or a model relationship. For example, the mathematical/statistical model may be based on comparing error values from the at least one second AI model including at least one short term model, selecting a plurality of models of the at least one second AI model based on an aggregate error value, and maximizing the first probability $P_1$ by associating the at least one long term model with the plurality of models. Further, in response to selecting the representative AI model, one or more actions may be implemented, including at least one of modifying a network port, modifying a server configuration, adding or removing server systems, or modifying a controller module.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
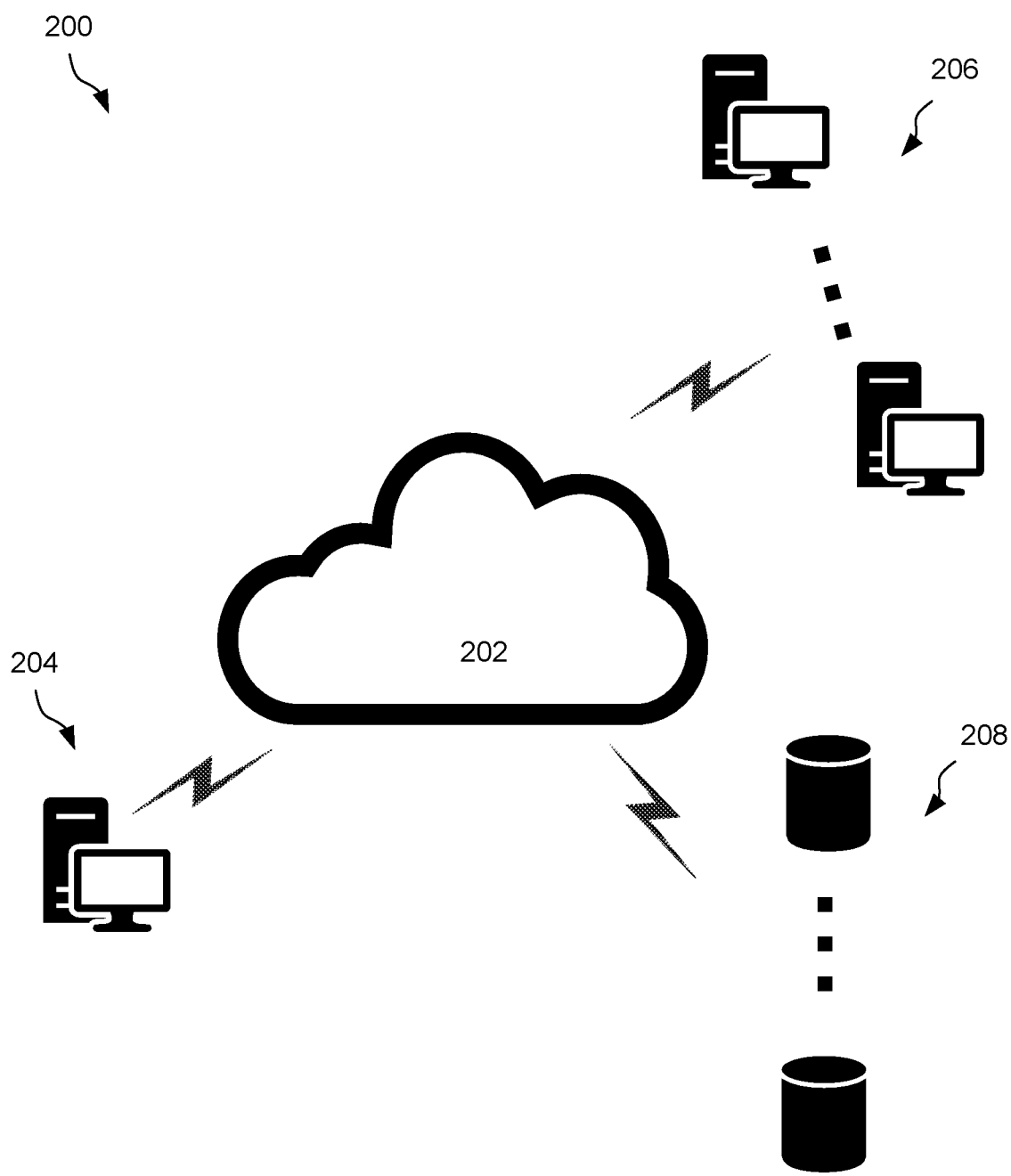
FIG. 2 shows a system for validating artificial intelligence models, in accordance with one embodiment.

FIG. 2 shows a system 200 for validating artificial intelligence models, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for validating artificial intelligence models. The system 204 may also be in communication with one or more repositories/databases 208.

In operation, the system 204 may run multiple AI models to validate a single AI model of interest.

In one embodiment, a model may be used to decide whether an intervention is needed. For example, if network traffic is predicted to pass a threshold in two hours, a server may need to be added. As such, when the model makes a prediction, a server may be added in response. Another example may include a storm warning, where, when the model makes a prediction of a storm, a port may be closed. In this manner, the model may implement one or more actions (e.g., by or to the network) based on the evaluation of the prediction.

However, one problem generally that may arise is that the current data that is being used for prediction may be different than the data that was used for learning, which in turn, may lead to mistakes. For example, if data relating to an amount of traffic in a weekend was used to predict holiday traffic, the resulting prediction would be inaccurate (as normal weekend traffic may fluctuate on a holiday weekend), etc.

The system 204 may use auxiliary models that do the same thing but that can be validated in a faster way, for example, predicting the traffic in less (e.g., six) minutes. In one embodiment, instead of having a 2-hour prediction model (or any amount of time needed to instantiate the server), the system 204 may use a 2.1-hour prediction model L and a 0.1-hour prediction model S that are trained on the same data and potentially using the same algorithms. The system 204 runs both models and if the 2.1-hour prediction model indicates a new server is needed, the system 204 checks the 0.1-hour prediction model S.

After checking the 0.1-hour prediction model, the system 204 can better estimate the accuracy of the long term model, or may associate less confidence in the long term model. For example, the two models L and S may be trained on the same data, using the same technology.

In various embodiments, a relationship may exist between a long term model and one or more short term models. In one embodiment, the relationship may be based on a mathematical/statistical model. In another embodiment, the relationship may be based on a historical correlation (such as past experience or past data) such that use of the short term model gives a good indication of the associated long term model. For example, three long term models and seven short term models may exist. The system may determine which subset of the short term models predicts well for each of the long term models. During an evaluation stage, one or more short term models may be associated with a long term model. During a production stage, the long term model is selected based on the errors of the associated short term models. The error associated with the short term models is therefore measured. A second probability $P_2$ for each of the three long term models (based on the error associated with the short term models) may be calculated, and a long term model with the highest second probability $P_2$ may be selected. As such, the error associated with the one or more short term models may be used to predict how well the long term model predicts.

In operation, the system 204 creates the model L needed in the learning. The model has a prediction for future time T. This can be done using any machine learning method.

The system 204 then uses a model S in the same way as L, using the same data. In one embodiment, S makes the prediction for time $t \ll T$ (i.e., the time interval is less). For example, in one embodiment, T may be next week, and t may be two hours from a present time. When L makes a prediction for time T, the prediction may be associated with a first probability $P_1$. In like manner, S may make a prediction, but for time t (rather than time T). E may be the error of the prediction of S. In one embodiment, E may be a number, a binary result, etc. The results of E may then be compared to P. It is to be noted that P may be independent of the actual situation at time t. For example, the system 204 may predict the weather for tomorrow 80% of the time. As such, the prediction today may be as good as that of next week. In this manner, the system 204 may be able to determine if now is a good time to perform predictions. P may therefore be a function of E, such that the system 204 uses S, measures E, and uses that to evaluate P associated with L.

In one embodiment, many models may be used to perform the same prediction and the system 204 may choose the best model among the many models. For example, the many models may be separated into pairs (e.g., $L_1$ and $S_1$, $L_2$ and $S_2$, $L_3$ and $S_3$, and so on) and the long term prediction may be performed according to which of the short-term predictions worked best (i.e., based on the lowest error E).

As such, the system 204 may choose between models $L_1$, $L_2$, $L_3$, and so on according to which associated short prediction model $S_1$, $S_2$ $S_3$, and so on is best (again based on the lowest error E), which in turn may be further validated. For example, there may be three weather predictors, all about equally good, so it is not known which one is likely to work better now (with current situation and data) predicting the weather tomorrow. The system 204 uses the same models for short-term prediction (e.g., 1 hour) and follows with the long term model that gives the best results when predicting a day according to the error of the associated short term model.

In one embodiment, this process may be an extension of running multiple models to validate a single AI model of interest, while choosing the prediction which is best given the current data.

For example, there may be three pairs, $L_1$ $S_1$, $L_2$ $S_2$, and $L_3$ $S_3$. Generically the predictive power of $L_1$, $L_2$ and $L_3$ may be the same (e.g., 80%, etc.). However, the system 204 may run $S_1$, $S_2$ and $S_3$ and get errors for them. The system 204 may recalculate the prediction of $L_1$, $L_2$ and $L_3$ given $E(S_1)$ and $E(S_2)$ and $E(S_3)$ and determine that the new prediction is 90%, 50% and 80% respectively, so the system 204 chooses the prediction of $L_1$ which gives the highest P (based on the lowest E associated with $S_1$).

The system 204 may then integrate the models to one model. For example, the system 204 may include multiple models, and the system 204 may create a single composite model by using a prediction to predict which model at any one time is the best. The system 204 therefore performs prediction with auxiliary models and uses the evaluated quality of the prediction to decide which model to use out of the real models.

In one embodiment, the system 204 may determine (via a learning process) which S belongs to which L. This may be performed on short term and long term models. The system 204 can look historically to determine if there is a correlation and use the short term to decide which long term to use. It could be that there are many models each created for different durations using different algorithms. The system 204 may determine whether there is a relationship between the models. For example, there may be 10 short term models and 3 long term models. The system 204 may determine that if short term model $S_1$, and $S_7$ give the best prediction, it is likely that long term model $L_2$ gives the better prediction of the long term models.

Each long term model has a predictive power. The system 204 seeks to find a correlation between the quality of the prediction of the short term models and the long term models. There are many vectors of the form $E_1 \ldots E_N$, $P_1 \ldots P_K$. $E_i$ may be the error in prediction of short term model i ($S_i$) on some data. $P_j$ is the probability (first probability $P_1$) that $L_3$ (long j) predicts well for the data. Without $E_1 \ldots E_N$, if $P_j$ were evaluated, the prediction could be 80% (or any value). In contrast, with $E_1 \ldots E_N$, the system may recalculate the predictions of the long term models (e.g., $L_1, L_2, L_3$, etc.) given $E_1 \ldots E_N$, and determine that the new predictions are 90%, 50% and 80% respectively, such that a prediction of $L_j$ may be selected to give the highest recalculated (second probability $P_2$) $P_j$.

The system 204 may then seek to find correlations and to estimate $P_3$ better as a function of $E_1 \ldots E_N$. If there is success, then the system 204 measures $E_1 \ldots E_N$ (errors for the short term predictions). Then the system 204 evaluates $P_1 \ldots P_K$. The one with the best score is likely the best model.

Figure 3:
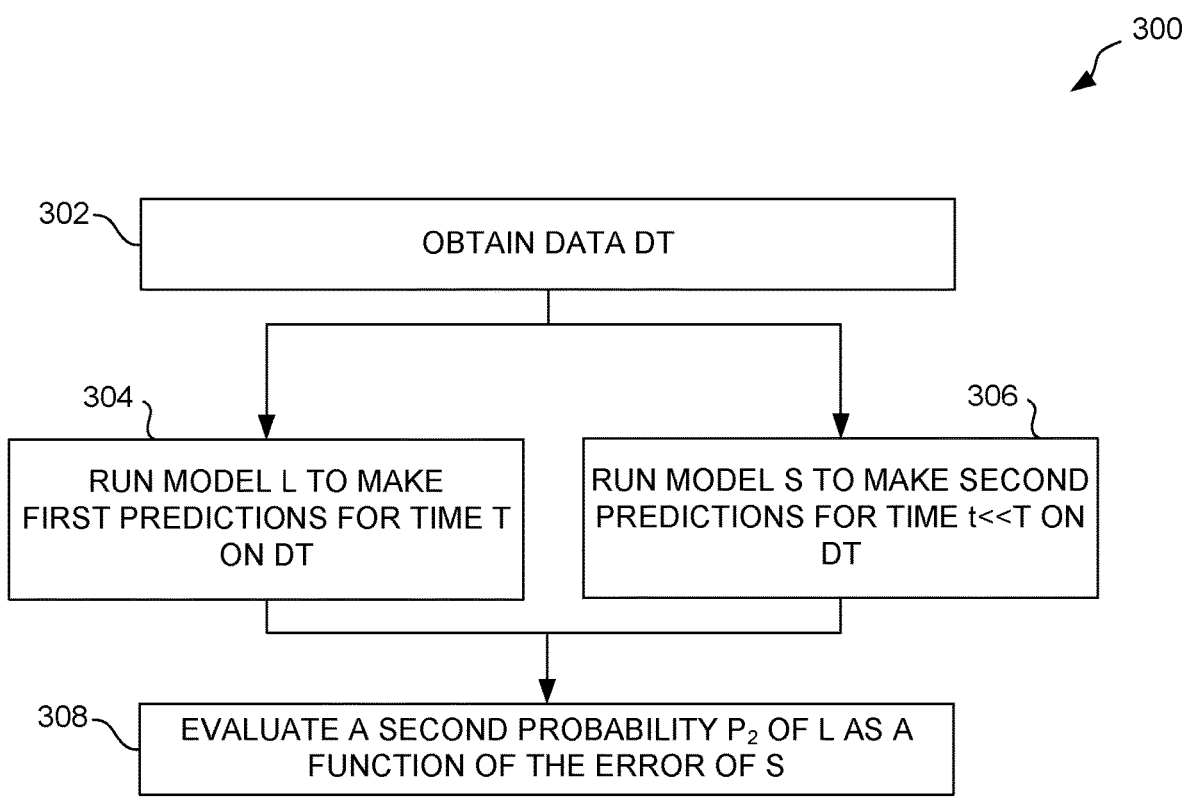
FIG. 3 shows a system flow diagram for probability valuation based on a short time model, in accordance with one embodiment.

FIG. 3 shows a system flow diagram 300 for probability valuation based on a short time model, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, the system obtains Data DT. See operation 302. The system runs model L to make first predictions for time T on DT. See operation 304. The system runs model S to make second predictions for time t<<T on DT. See operation 306. The system evaluates a second probability $P_2$ of L as a function of the error of S. See operation 308. For example, if S succeeded, L has a better probability to succeed in comparison to the event that S failed.

Figure 4:
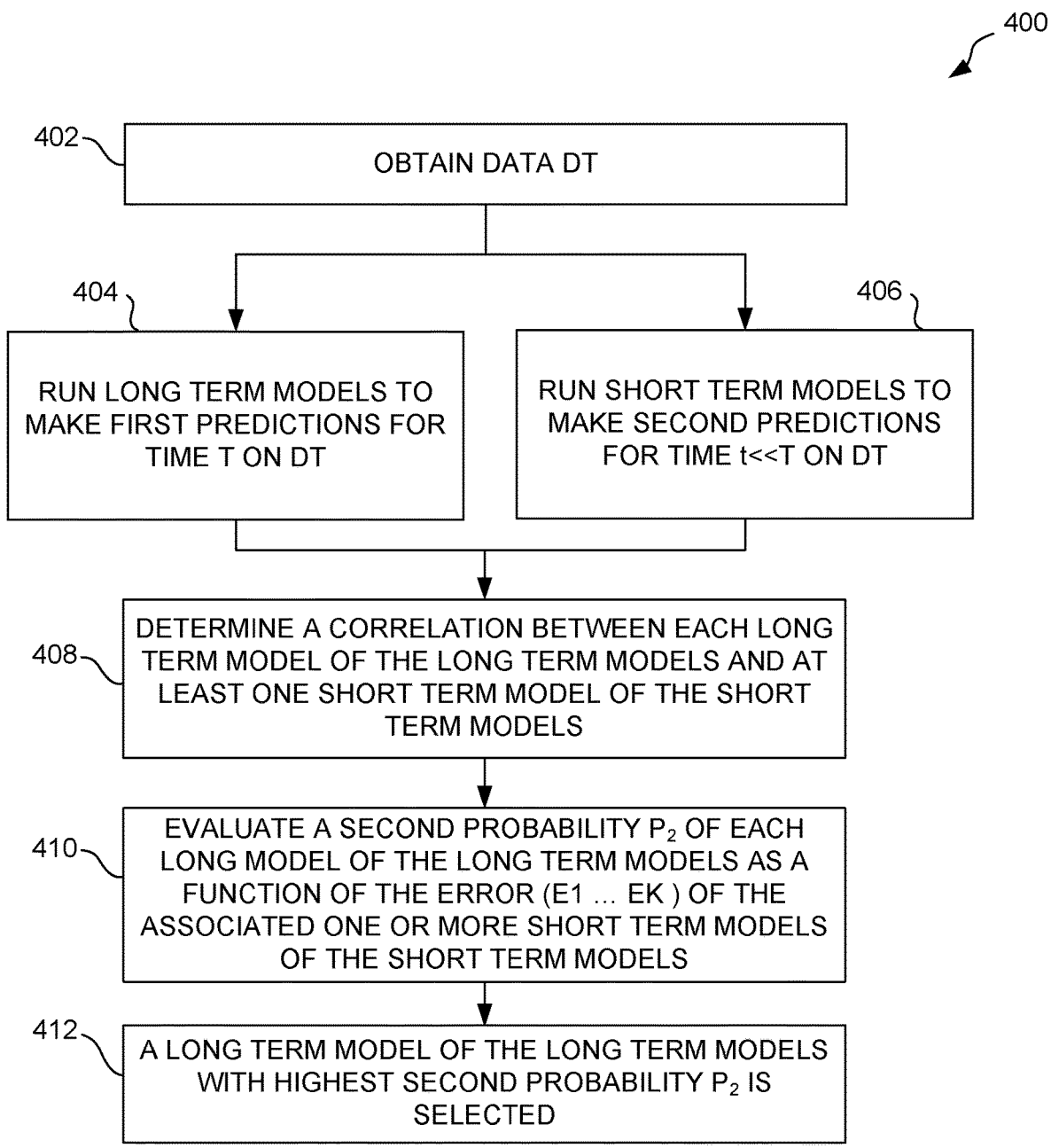
FIG. 4 shows a system flow diagram for creating a new composite algorithm, in accordance with one embodiment.

FIG. 4 shows a system flow diagram 400 for creating a new composite algorithm, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

As shown, the system obtains Data DT. See operation 402. The system runs one or more long term models to make first predictions for time T on DT. See operation 404. The system runs one or more short term models to make predictions for time t<<T on DT. See operation 406. In one embodiment, the system determines a correlation between each long term model of the long term models and at least one short term model of the short term models. See operation 408. The system evaluates a second probability $P_2$ of each long term model of the long term models as a function of the error ($E_1 \ldots E_k$) of the associated one or more short term models of the short term models. See operation 410.

Additionally, a long term model of the long term models is selected with highest second probability $P_2$. See operation 412.

Figure 5:
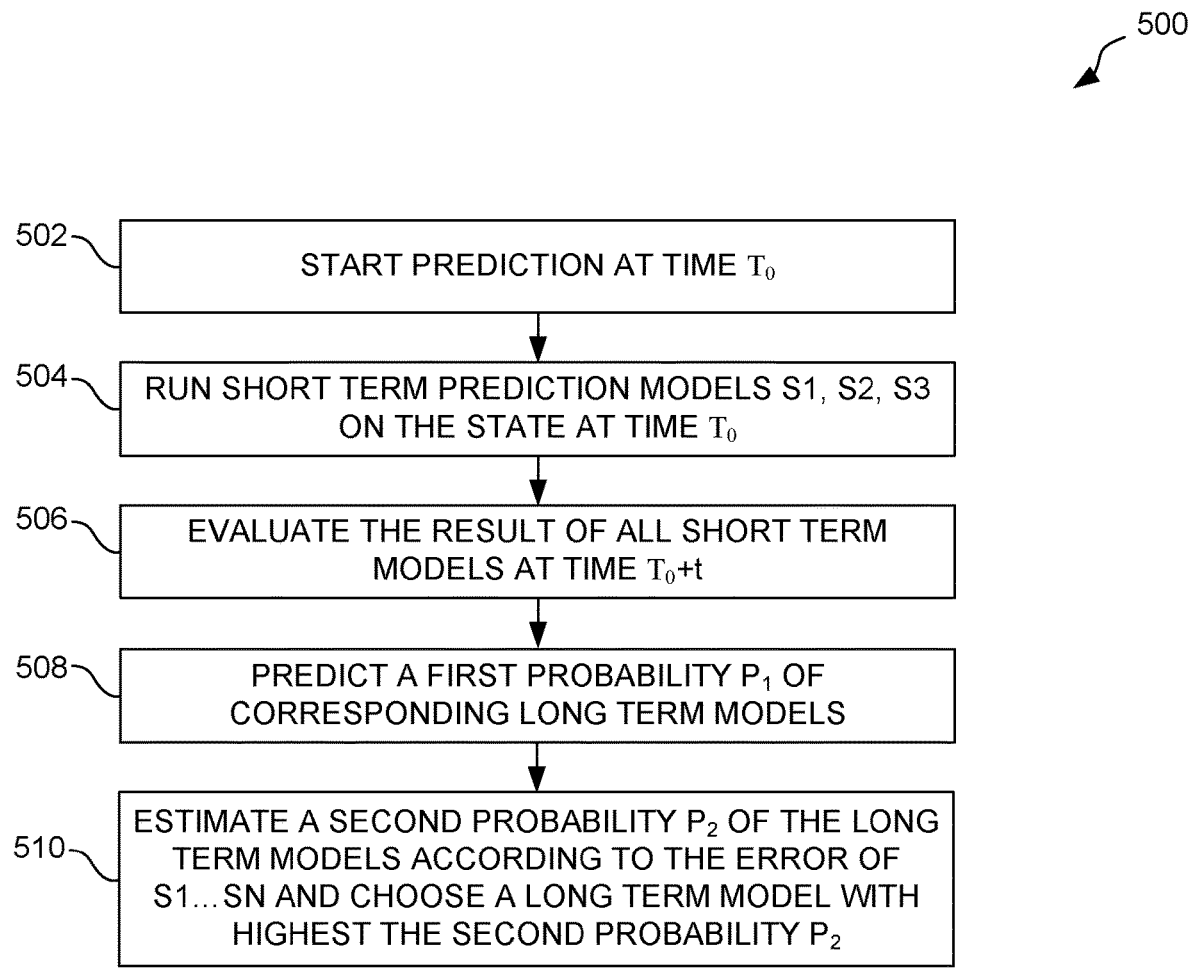
FIG. 5 shows a system flow diagram for running a new decision algorithm, in accordance with one embodiment.

FIG. 5 shows a system flow diagram 500 for running a new decision algorithm, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

As shown, the system starts a prediction at time $T_0$. See operation 502. The system runs short term prediction models $S_1, S_2, S_3$, etc., at time $T_0$. See operation 504. The system evaluates the result of all short term models at time $T_0+t$. See operation 506. The system predicts a first probability $P_1$ of corresponding long term models (evaluated for time T). See operation 508. The system estimates a second probability $P_2$ of the long term models according to the error of $S_1 \ldots S_N$ and chooses a long term model with highest second probability $P_2$. See operation 510. For example, the highest quality may correspond to the long term model with the most accurate P, which may be determined based on the lowest error of a corresponding short term model.

In various embodiments, the best long term model may be achieved based on multiple models, or model pairs. For example, long term model L may be associated with multiple short term models $S_1 \ldots S_n$ (or any number of short term models) and/or a first short term model set (comprising one or more short term models). In another embodiment, a long term model may be selected from long term models $L_1, L_2, L_3$ (or any number of models), where each long term model is associated with either a specific short term model (e.g., $S_1$, $S_2, S_3$), or with a subset of short term models (e.g., $S_1$ and $S_7$).

Figure 6:
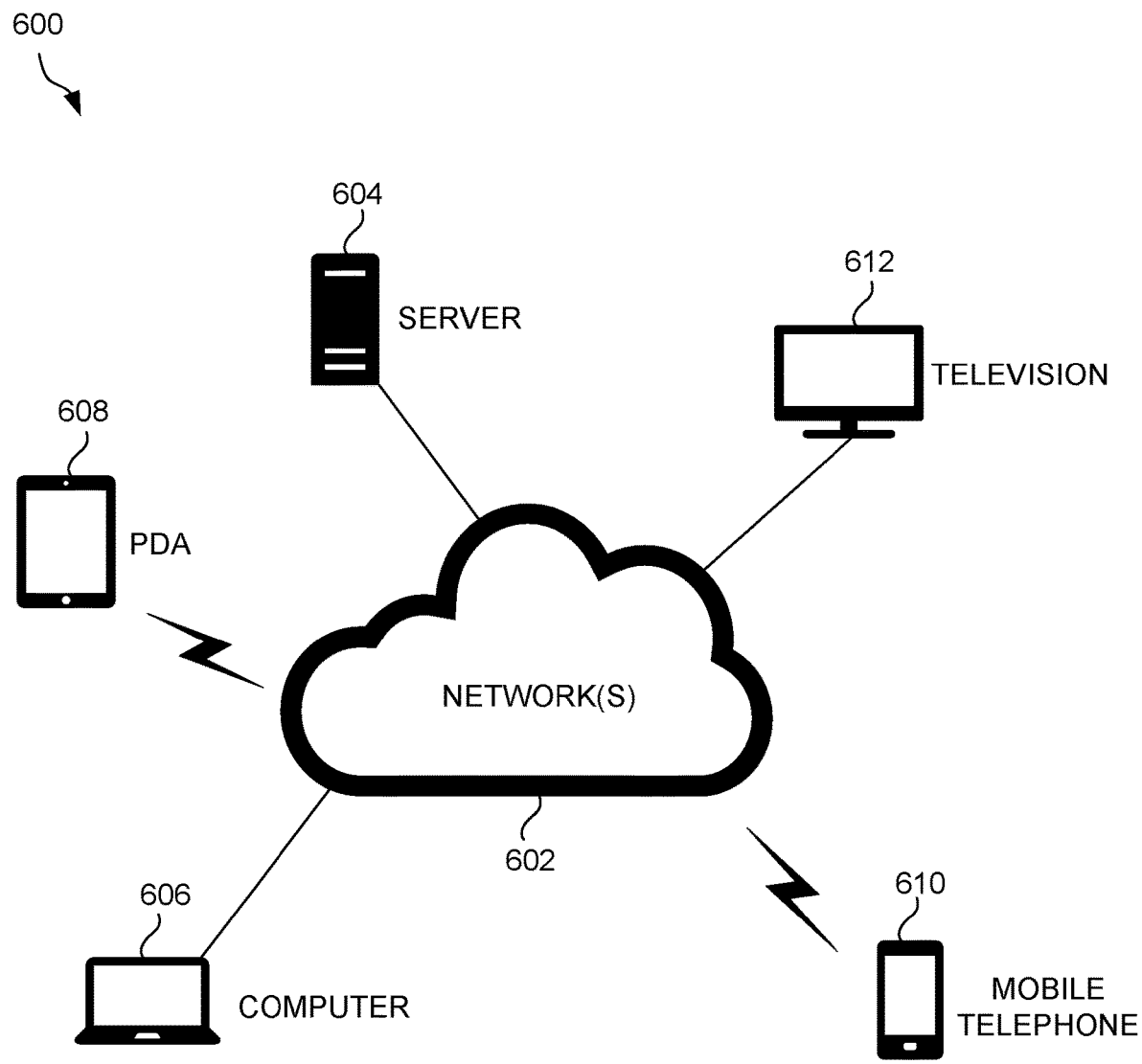
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
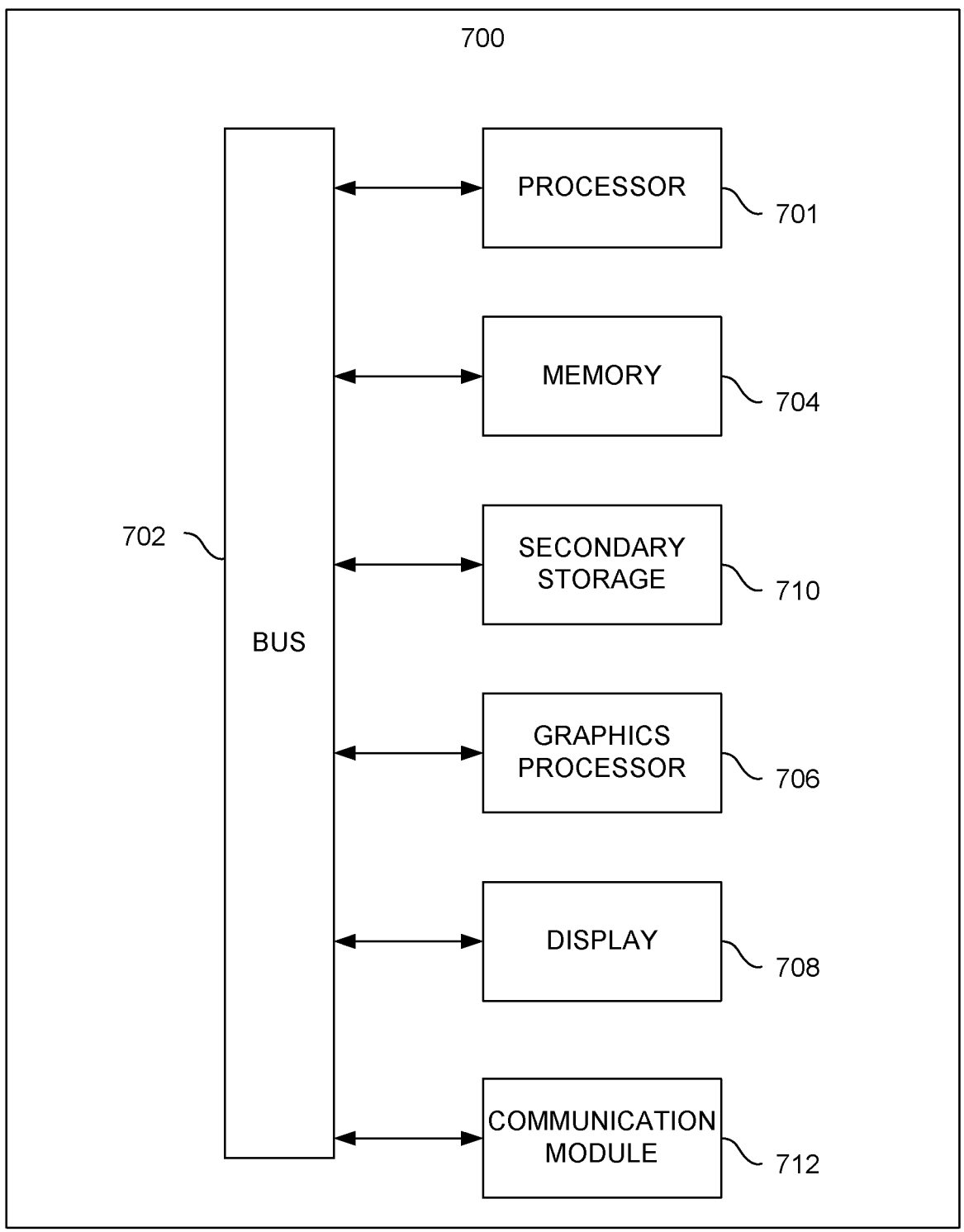
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable storage media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium", such as a non-transitory computer-readable storage medium, includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code that when executed by a processor cause the processor to:
    identify a plurality of first artificial intelligence (AI) models all configured to make a first type of prediction for a same first future time period;
    identify a plurality of second AI models all configured to make the first type of prediction for a same second future time period that is less than, and at least partially within, the first future time period;
    obtain a data set;
    run the plurality of first AI models on the data set to output respective first predictions for the first future time period;
    run the plurality of second AI models on the data set to output respective second predictions for the second future time period;
    correlate each first AI model of the plurality of first AI models to one second AI model of the plurality of second AI models, to form a plurality of model pairs each comprised of one first AI model of the plurality of first AI models and one second AI model of the plurality of second AI models;
    calculate a first probability of each of the first predictions and an error of each of the second predictions, the first probability calculated for each of the first predictions being a measurement of an accuracy of the first prediction for the data set;
    for each model pair of the plurality of model pairs:
    calculate a second probability of the accuracy of the first prediction of the one first AI model in the model pair based on the first probability calculated for the first prediction and the error calculated for the second prediction of the one second AI model in the model pair, wherein the second probability is a function of the error such that the second probability of the accuracy of the first prediction increases as the error of the second prediction decreases;
    determine a highest second probability of accuracy from the second probabilities calculated for the first predictions;
    select one of the first AI models that made the first prediction having the highest second probability as a best quality AI model among the plurality of first AI models for making predictions from the data set; and
    implement one or more actions based on the first prediction output by the selected one of the first AI models, including at least one of modifying a network port, modifying a server configuration, adding or removing server systems, or modifying a controller module.

2. The non-transitory computer readable medium of claim 1, wherein the error is calculated for each of the second predictions based on a deviation between the second prediction and a result of the data set evaluated at the conclusion of the second future time period.

3. A method, comprising:
    identifying, by a system, a plurality of first artificial intelligence (AI) models all configured to make a first type of prediction for a same first future time period;
    identifying, by the system, a plurality of second AI models all configured to make the first type of prediction for a same second future time period that is less than, and at least partially within, the first future time period;
    obtaining, by the system, a data set;
    running, by the system, the plurality of first AI models on the data set to output respective first predictions for the first future time period;
    running, by the system, the plurality of second AI models on the data set to output respective second predictions for the second future time period;
    correlating, by the system, each first AI model of the plurality of first AI models to one second AI model of the plurality of second AI models, to form a plurality of model pairs each comprised of one first AI model of the plurality of first AI models and one second AI model of the plurality of second AI models;
    calculating, by the system, a first probability of each of the first predictions and an error of each of the second predictions, the first probability calculated for each of the first predictions being a measurement of an accuracy of the first prediction for the data set;
    for each model pair of the plurality of model pairs:
    calculating, by the system, a second probability of the accuracy of the first prediction of the one first AI model in the model pair based on the first probability calculated for the first prediction and the error calculated for the second prediction of the one second AI model in the model pair, wherein the second probability is a function of the error such that the second probability of the accuracy of the first prediction increases as the error of the second prediction decreases;
    determining, by the system, a highest second probability of accuracy from the second probabilities calculated for the first predictions;
    selecting, by the system, one of the first AI models that made the first prediction having the highest second probability as a best quality AI model among the plurality of first AI models for making predictions from the data set; and
    implementing, by the system, one or more actions based on the first prediction output by the selected one of the first AI models, including at least one of modifying a network port, modifying a server configuration, adding or removing server systems, or modifying a controller module.

4. The method of claim 3, wherein the error is calculated for each of the second predictions based on a deviation between the second prediction and a result of the data set evaluated at the conclusion of the second future time period.

5. A system, comprising:
    a non-transitory memory storing instructions; and
    one or more processors in communication with the non-transitory memory, wherein the one or more processors execute the instructions to:

identify a plurality of first artificial intelligence (AI) models all configured to make a first type of prediction for a same first future time period;

identify a plurality of second AI models all configured to make the first type of prediction for a same second future time period that is less than, and at least partially within, the first future time period;

obtain a data set;

run the plurality of first AI models on the data set to output respective first predictions for the first future time period;

run the plurality of second AI models on the data set to output respective second predictions for the second future time period;

correlate each first AI model of the plurality of first AI models to one second AI model of the plurality of second AI models, to form a plurality of model pairs each comprised of one first AI model of the plurality of first AI models and one second AI model of the plurality of second AI models;

calculate a first probability of each of the first predictions and an error of each of the second predictions, the first probability calculated for each of the first predictions being a measurement of an accuracy of the first prediction for the data set;

for each model pair of the plurality of model pairs:
calculate a second probability of the accuracy of the first prediction of the one first AI model in the model pair based on the first probability calculated for the first prediction and the error calculated for the second prediction of the one second AI model in the model pair, wherein the second probability is a function of the error such that the second probability of the accuracy of the first prediction increases as the error of the second prediction decreases;

determine a highest second probability of accuracy from the second probabilities calculated for the first predictions;

select one of the first AI models that made the first prediction having the highest second probability as a best quality AI model among the plurality of first AI models for making predictions from the data set; and implement one or more actions based on the first prediction output by the selected one of the first AI models, including at least one of modifying a network port, modifying a server configuration, adding or removing server systems, or modifying a controller module.

6. The system of claim 5, wherein the error is calculated for each of the second predictions based on a deviation between the second prediction and a result of the data set evaluated at the conclusion of the second future time period.

* * * * *